United States Patent
Renwick

(10) Patent No.: US 9,041,661 B2
(45) Date of Patent: May 26, 2015

(54) COVER FOR AN ELECTRONIC DEVICE

(75) Inventor: James Edward Renwick, Santa Monica, CA (US)

(73) Assignee: Nokia Corporation, Espoo (FI)

( * ) Notice: Subject to any disclaimer, the term of this patent is extended or adjusted under 35 U.S.C. 154(b) by 244 days.

(21) Appl. No.: 12/856,100

(22) Filed: Aug. 13, 2010

(65) Prior Publication Data

US 2012/0039023 A1     Feb. 16, 2012

(51) Int. Cl.
| G06F 3/041 | (2006.01) |
| G06F 1/16  | (2006.01) |
| G06F 1/18  | (2006.01) |
| H04M 1/02  | (2006.01) |

(52) U.S. Cl.
CPC ...... *G06F 1/1626* (2013.01); *G06F 2200/1632* (2013.01); *G06F 2200/1633* (2013.01); *H04M 1/0283* (2013.01); *G06F 1/182* (2013.01)

(58) Field of Classification Search
CPC .......... G06F 1/1626; G06F 2200/1632; G06F 1/182; G06F 2200/1633; H04M 1/0283
USPC ............... 455/90.3, 571; 361/679.01–679.61; 345/173, 169; 178/18.03, 18.06
See application file for complete search history.

(56) References Cited

U.S. PATENT DOCUMENTS

| 4,973,951 | A | * | 11/1990 | Shigeta et al. | 345/1.3 |
| 5,367,309 | A | * | 11/1994 | Tashjian | 343/702 |
| 5,555,157 | A | * | 9/1996 | Moller et al. | 361/679.3 |
| 5,742,894 | A | | 4/1998 | Jambhekar et al. | 455/90 |
| 5,887,995 | A | | 3/1999 | Holehan | 400/479.1 |
| 6,154,359 | A | * | 11/2000 | Kamikakai et al. | 361/679.27 |
| 6,259,044 | B1 | * | 7/2001 | Paratore et al. | 200/5 A |
| 6,323,846 | B1 | * | 11/2001 | Westerman et al. | 345/173 |
| 6,549,789 | B1 | * | 4/2003 | Kfoury | 455/550.1 |
| 7,180,735 | B2 | * | 2/2007 | Thomas et al. | 361/679.56 |
| 7,339,577 | B2 | * | 3/2008 | Sato et al. | 345/173 |
| 7,438,978 | B2 | * | 10/2008 | Kotsubo et al. | 428/483 |
| 7,499,040 | B2 | * | 3/2009 | Zadesky et al. | 345/204 |
| 7,545,341 | B2 | * | 6/2009 | Brask | 345/1.1 |
| 7,609,178 | B2 | * | 10/2009 | Son et al. | 341/33 |
| 7,609,512 | B2 | * | 10/2009 | Richardson et al. | 361/679.41 |

(Continued)

FOREIGN PATENT DOCUMENTS

| EP | 2020631 A2 * | 2/2009 |
| EP | 2 090 971 A1 | 8/2009 |

(Continued)

OTHER PUBLICATIONS

"Wikipedia page for Silicone Rubber", http://en.wikipedia.org/wiki/Silicone_rubber, last modified on Feb. 22, 2011, (4 pages).

(Continued)

*Primary Examiner* — Lun-Yi Lao
*Assistant Examiner* — Peter D McLoone
(74) *Attorney, Agent, or Firm* — Harrington & Smith

(57) ABSTRACT

A cover configured to overlie a touch screen of an electronic device the cover including an output portion configured to enable content presented on the touch screen to be visible to a user through the cover; and the cover including a plurality of distinct input portions each sharing a physical characteristic that demarcates each of the plurality of distinct input portions as an input portion, wherein each of the plurality of distinct input portions is configured to enable one of a plurality of touch sensitive areas of the touch screen to be actuated.

20 Claims, 4 Drawing Sheets

(56) References Cited

U.S. PATENT DOCUMENTS

Figure 1:
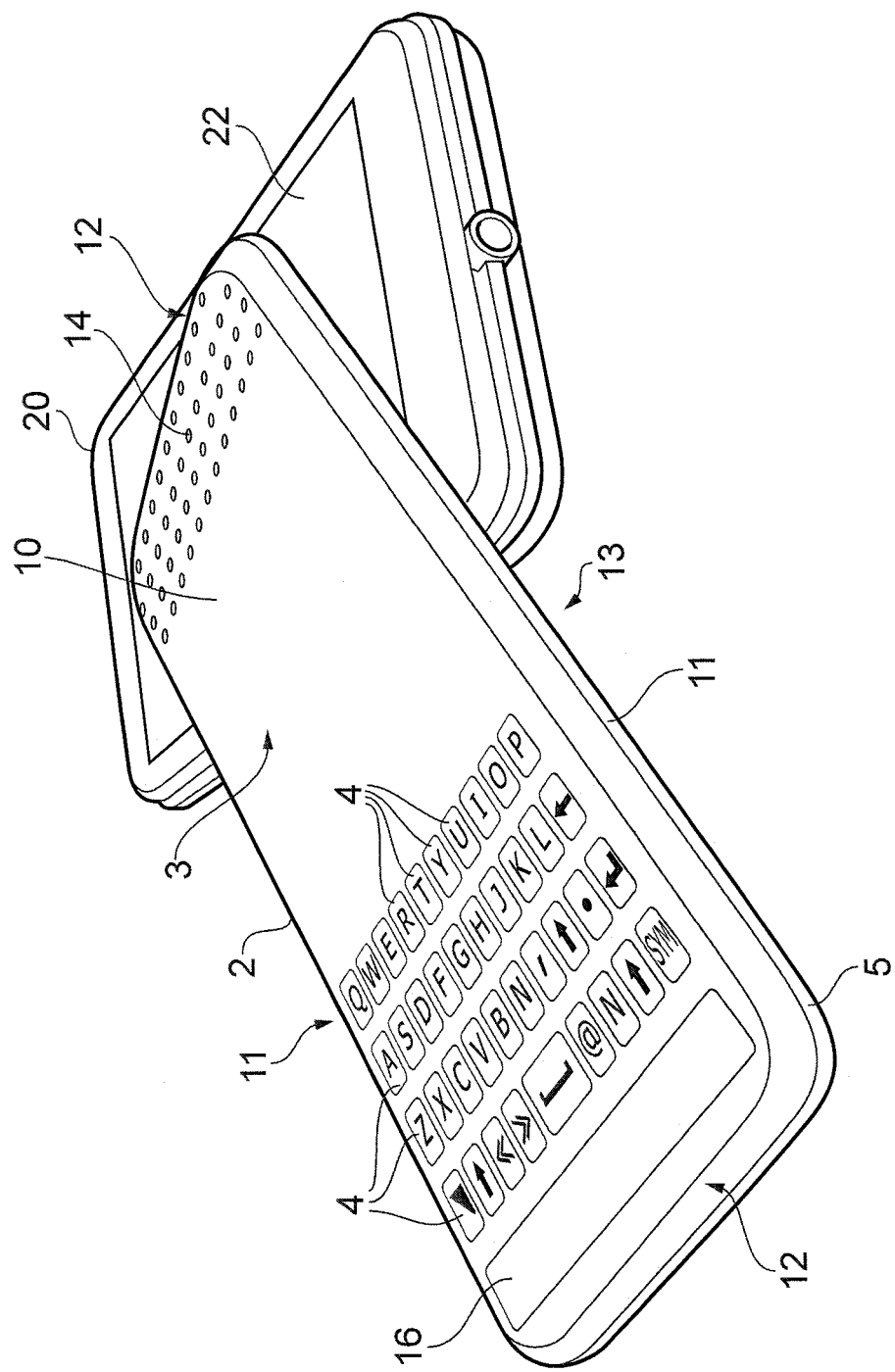

| | | | |
|---|---|---|---|
| 7,663,879 B2* | 2/2010 | Richardson et al. | 361/679.56 |
| 7,688,580 B2* | 3/2010 | Richardson et al. | 361/679.56 |
| 7,889,489 B2* | 2/2011 | Richardson et al. | 361/679.32 |
| 8,068,331 B2* | 11/2011 | Sauers et al. | 361/679.01 |
| 8,422,205 B2* | 4/2013 | Liao et al. | 361/679.01 |
| 8,446,711 B2* | 5/2013 | Liao et al. | 361/679.01 |
| 8,675,353 B1* | 3/2014 | Alonzo et al. | 361/679.01 |
| 2002/0054030 A1 | 5/2002 | Murphy | 345/173 |
| 2002/0180707 A1* | 12/2002 | Sato et al. | 345/169 |
| 2005/0174727 A1* | 8/2005 | Thomas et al. | 361/681 |
| 2006/0152885 A1* | 7/2006 | Hewit et al. | 361/283.1 |
| 2006/0187140 A1* | 8/2006 | Brask | 345/1.1 |
| 2006/0250377 A1* | 11/2006 | Zadesky et al. | 345/173 |
| 2007/0257821 A1* | 11/2007 | Son et al. | 341/22 |
| 2009/0033636 A1* | 2/2009 | Toyota et al. | 345/174 |
| 2011/0163986 A1* | 7/2011 | Lee et al. | 345/173 |
| 2011/0235246 A1* | 9/2011 | Liao et al. | 361/679.01 |
| 2011/0235247 A1* | 9/2011 | Liao et al. | 361/679.01 |

FOREIGN PATENT DOCUMENTS

| | | |
|---|---|---|
| GB | 2 382 291 A2 | 5/2003 |
| WO | WO 02/31807 A1 | 4/2002 |

OTHER PUBLICATIONS

"Dow Corning Electrically Conductive Materials Product Information Sheet", Form 11-1072B-01, (2004), (9 pages).

"3M Fiber Optic Polishing: Total Solutions for Your Polishing Needs", Electronics markets Materials Division 3M Electronics, (2009), (8 pages).

* cited by examiner

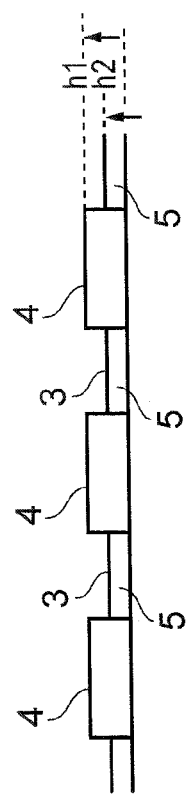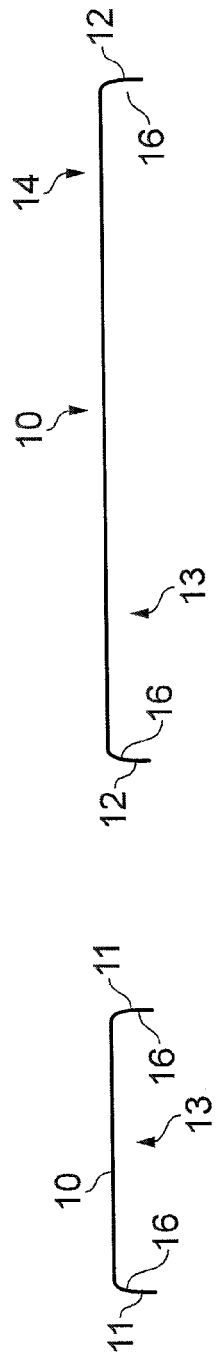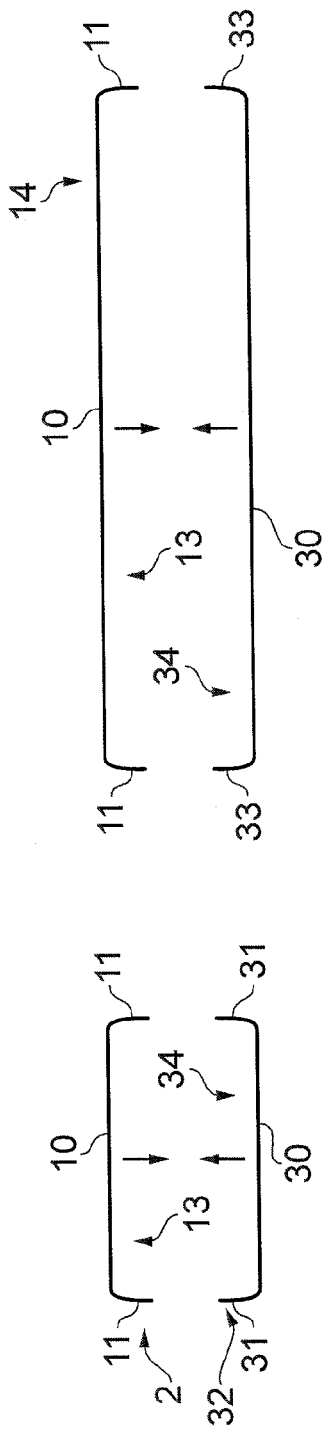

COVER FOR AN ELECTRONIC DEVICE

TECHNOLOGICAL FIELD

Embodiments of the present invention relate to a cover. Some embodiments relate to a supplementary cover that is applied by an end user to a functional hand portable electronic device.

BACKGROUND

A supplementary cover is a cover that is not necessary for the safe use or proper functioning on an electronic device but is applied over at least a portion of an existing cover for some additional purpose e.g. to protect some or all of the electronic device from damage.

A supplementary cover may be distinguished from a replacement cover. A replacement cover is a cover for the safe use or proper functioning of an electronic device and replaces an existing cover e.g. to change the aesthetic appearance of the electronic device.

BRIEF SUMMARY

According to various, but not necessarily all, embodiments of the invention there is provided a cover configured to overlie a touch screen of an electronic device the cover comprising an output portion configured to enable content presented on the touch screen to be visible to a user through the cover; and the cover comprising a plurality of distinct input portions each sharing a physical characteristic that demarcates each of the plurality of distinct input portions as an input portion, wherein each of the plurality of distinct input portions is configured to enable one of the plurality of touch sensitive areas of the touch screen to be actuated.

According to various, but not necessarily all, embodiments of the invention there is provided a cover configured to overlie a touch screen of an 19. A system comprising: an electronic device comprising a housing having a rear face and a front face comprising a touch screen; and a user replaceable cover which when attached to the front face of the electronic device provides a keyboard over the touch screen.

According to various, but not necessarily all, embodiments of the invention there is provided a method comprising: configuring an electronic device comprising a touch screen by attaching a cover configured to overlie the touch screen of the electronic device, the cover comprising an output portion configured to enable content presented on the touch screen to be visible to a user through the cover and a plurality of distinct input portions each sharing a physical characteristic that demarcates each of the plurality of distinct input portions as an input portion, wherein each of the plurality of distinct input portions is configured to enable one of the plurality of touch sensitive areas of the touch screen to be actuated.

BRIEF DESCRIPTION

Figure 5:
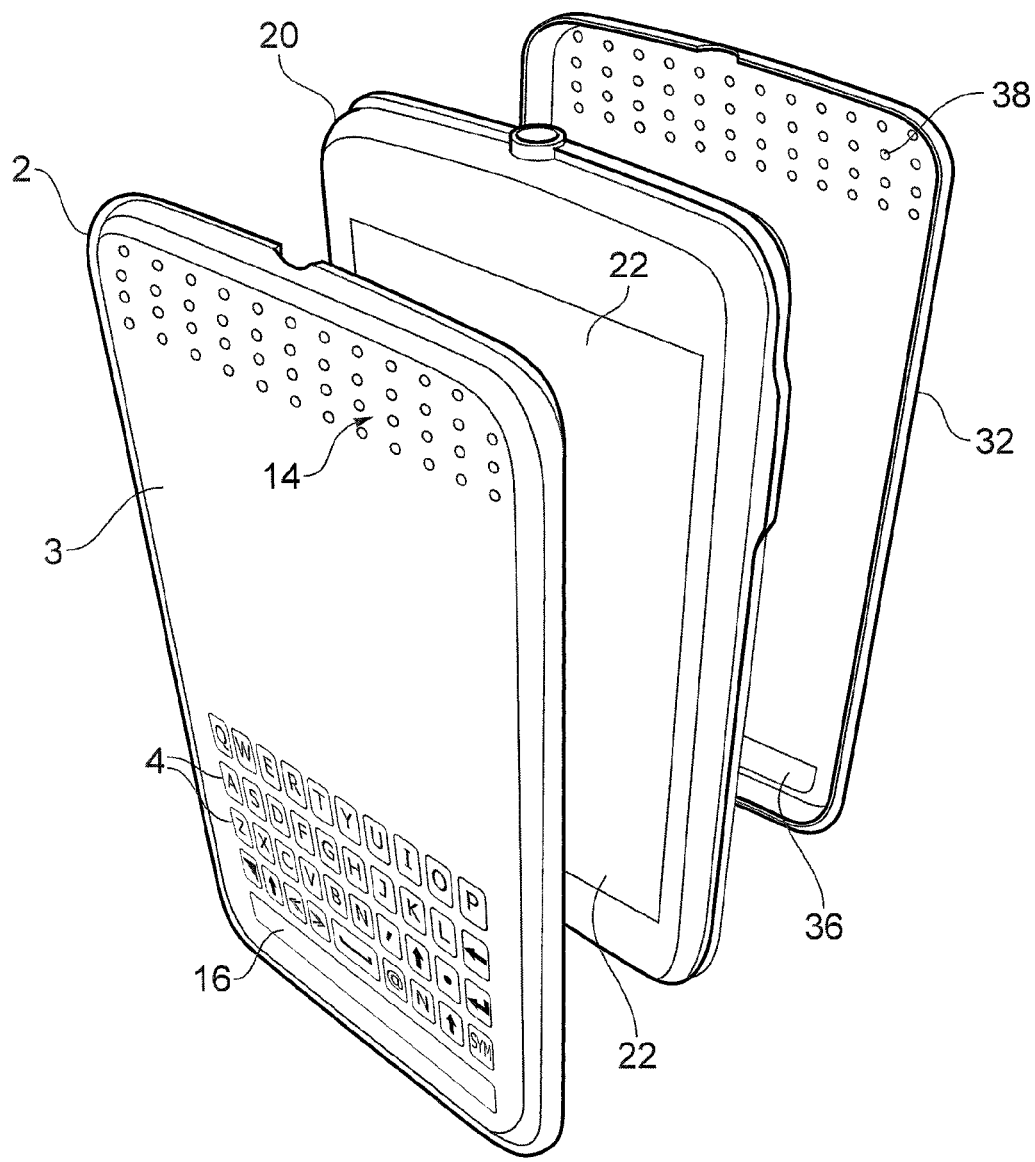
Figure 6:
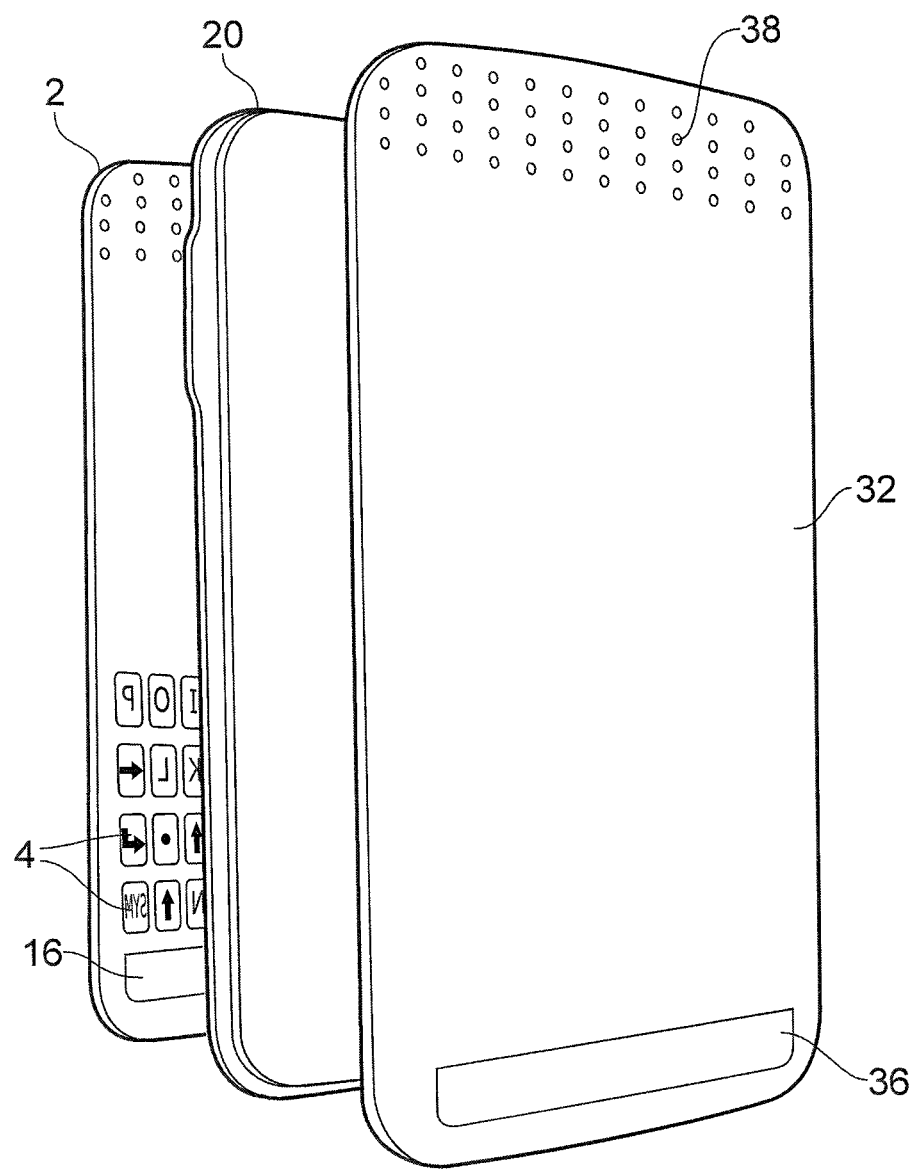

For a better understanding of various examples of embodiments of the present invention reference will now be made by way of example only to the accompanying drawings in which:

FIG. 1 schematically illustrates a cover configured to be user-releasably attached to a hand portable electronic device;

FIG. 2 schematically illustrates a cross-sectional view through a plurality of distinct input portions that have higher relief than intervening portions of a housing;

FIG. 3A schematically illustrates the cover in a width-wise cross-sectional view and FIG. 3B schematically illustrates the cover in a length-wise cross-sectional view;

FIG. 4A schematically illustrates a combination of a cover and an additional cover in a width-wise cross-sectional view and FIG. 4B schematically illustrates a combination of the cover and the additional cover in a length-wise cross-sectional view;

FIG. 5 schematically illustrates a combination of a cover, an additional cover and an electronic device from a front perspective view and FIG. 6 schematically illustrates a combination of a cover, an additional cover and an electronic device from a rear perspective view.

DETAILED DESCRIPTION

FIG. 1 schematically illustrates a cover 2 configured to be user-releasably attached to a hand portable electronic device 20 that has a touch screen 22. When attached, the cover 2 overlies the touch screen 22 and still enables touch actuation of at least a plurality of touch sensitive areas of the touch screen 22.

The cover 2 has a front face 10 comprising an output portion 3 and a plurality of distinct input portions 4.

The output portion 3 is configured to enable content presented on the touch screen 22 of the electronic device 20 to be visible to a user through the cover 2 when the cover 2 overlies the touch screen 22.

The plurality of distinct input portions 4 each share a physical characteristic that physically demarcates each of the plurality of distinct input portions 4 as an input portion. This may enable a user of the electronic device to accurately locate a position of an input portion 4 using touch.

When the cover 2 overlies the touch screen 22, each of the plurality of distinct input portions 4 overlies a different respective one of the plurality of touch sensitive areas of the touch screen 22. Each of the plurality of distinct input portions 4 are thus configured to enable a different one of the plurality of touch sensitive areas of the touch screen 22 to be accurately actuated by a user by pressing the respective distinct input portion 4.

Each of the plurality of distinct input portions 4 may carry an indicia or other marking that permanently indicates a function of the respective underlying touch sensitive area of the touch screen 22. For example, the plurality of distinct input portions 4 may form a keyboard for text entry such as a QWERTY keyboard.

In this illustrated example, the cover 2 is a supplementary cover which is applied over at least a portion of the electronic device 20 for some additional purpose. In this illustrated example, the additional purpose is to provide a keyboard that enables easier user input of text.

When the touch screen 22 is a capacitive touch screen, one can enable actuation of a touch sensitive area when a user presses an overlying distinct input portion 4, by ensuring that the relative permittivity of the distinct input portion 4 is sufficiently large and the thickness of the distinct input portion is sufficiently small that the capacitive coupling between a user's digit touching a distinct input portion 4 overlying a touch sensitive area of the touch screen 22 is sufficient to cause actuation of that touch sensitive area. Typically, the distinct input portions 4 may, for example, have a thickness less than 1 mm.

In some embodiments, the distinct input portions 4 may be resiliently flexible and the relative permittivity of the distinct input portions 4 and the thickness of the distinct input portions 4 may be chosen such that when a user's digit touches a distinct input portion 4 overlying a touch sensitive area of the touch screen 22 actuation of that touch sensitive area does not occur but when a user presses and deforms (squashes) a distinct input portion 4 overlying a touch sensitive area of the touch screen 22 actuation of that touch sensitive area does occur. This functionality may be achieved by relying on the decrease in thickness of the distinct input portion 4 providing the necessary increase in capacitance to cause actuation or the material chosen for use as the distinct input portion 4 may be chosen to have a relative permittivity that increases substantially when compressed.

Each of the plurality of distinct input portions 4 may be supported as resiliently flexible protrusions by a one-piece rigid housing 5.

Each of the plurality of distinct input portions 4 may be formed from silicone. Capacitive silicone may be used such as dielectric silicone available from DOW CORNING.

Each of the plurality of distinct input portions 4 may be transparent or translucent.

The output portion 4 is a part of the rigid housing 5. The rigid housing 5 may be wholly transparent and is at least transparent at the output portion 4. The rigid housing 5 may, for example, be formed from polycarbonate.

A double shot technique may be used to form the combination of rigid housing 5 and the protrusions of distinct input portions 4.

The plurality of distinct input portions 4 may have a common relief that is different to adjacent portions of the housing 5 of the cover 2. For example, each of the plurality of distinct input portions may have a common raised-relief that is higher than adjacent portions of the housing 5. Referring to FIG. 2, each of the plurality of distinct input portions has a height h1 and the adjacent portions of the housing 5 have a height h2.

If the cover 2 is for use with a capacitive touch screen 22, the height h1 may, for example, be less than 1 mm to ensure capacitive coupling and each of the plurality of distinct input portions 4 will typically have a relative permittivity that is greater than the relative permittivity of housing 5.

FIG. 3A schematically illustrates the cover 2 in a width-wise cross-sectional view and FIG. 3B schematically illustrates the cover 2 in a length-wise cross-sectional view.

The Figures illustrate that the cover 2 may not only have the front face 10 comprising the output portion 3 (not labeled) and the plurality of distinct input portions 4 (not labeled) but may also have sidewalls 11 and end walls 12. The front face 10, side walls 11 and end walls 12 form a cavity 13 sized to receive at least a portion of the hand held electronic device 20 (not illustrated) comprising the touch sensitive screen 22.

The cover 2 may have apertures 14 that allow access to ports of the electronic device 20 such as data interfaces, audio inputs or audio outputs. In the Figures, the cover 2 comprises a series of apertures 14 on the front face near an upper end wall 12 which provide access to a loudspeaker of the electronic device 20.

The cover 2 may comprise a resiliently deformable region 16, separate from the input portions 4, which may be formed of silicone. In use the deformable region 16 may overlie user depressible keys of the electronic device 20 separate from the touch screen 22 and be used for non-text input.

The cover 2 may have a mechanism 16 for securing the cover 2 to the electronic device 20. The mechanism 16 may enable user attachment and/or user detachment of the cover 2 from the electronic device 20.

The cover 2 may be used by itself as the only cover. The cover 2 and the hand held electronic device 20 form a system in which the cover 3 may be placed over a touch screen 22 of a front face of the hand held electronic device 20 for use in actuating the touch screen 22. Alternatively, the cover 2 may be placed over a rear face of the hand held electronic device 20 where it is stowed for future removal and placement over the touch screen 22 in the front face of the hand held electronic device 20.

The cover 2 may also be used in combination with an additional cover 32 as illustrated in FIGS. 4A and 4B, 5 and 6.

The additional cover 32 is configured to be user-releasably attached to a hand portable electronic device 20 that has a touch screen 22. When attached, the additional cover 32 may overly the touch screen 22 and still enable touch actuation of the touch screen 22.

The additional cover 32 may have a front face 30, sidewalls 31 and end walls 33. The front face 10, side walls 31 and end walls 33 form a cavity 34 sized to receive at least a portion of the hand held electronic device 20 (not illustrated).

The front face comprises an output portion 3 configured to enable content presented on the touch screen 22 of the electronic device 20 to be visible to a user through the additional cover 32 when the additional cover 32 overlies the touch screen 22.

In this illustrated example, the cover 2 is a supplementary cover which is applied over at least a portion of the electronic device 20 for some additional purpose. In this illustrated example, the additional purpose is to provide an enclosure for the electronic device 20 in combination with the cover 2.

The additional cover 2 may be formed from one-piece rigid housing 5. The rigid housing may be wholly transparent and is at least transparent at the output portion. The rigid housing may, for example, be formed from polycarbonate.

The additional cover 32 may have apertures 38 that allow access to ports of the electronic device 20 such as data interfaces, audio inputs or audio outputs. In the Figures, the additional cover 32 comprises a series of apertures 38 on the front face near an upper end wall which provide access to a loudspeaker of the electronic device 20.

The additional cover 32 may comprise a resiliently deformable region 36, separate from the output portion, which may be formed of silicone. In use the deformable region 36 may overlie user-depressible keys of the electronic device 20 separate from the touch screen 22 and be used for non-text input.

The additional cover 32 may have a mechanism 16 for securing the additional cover 32 to the electronic device 20 or the cover 2. The mechanism 16 may enable user attachment and/or user detachment of the cover.

The cover 2 and the additional cover 32 in combination abut to form an enclosure that encloses the hand held electronic device 20 as illustrated in FIGS. 5 and 6.

The cover 2, the additional cover 32 and the hand held electronic device 20 form a system in which the cover 3 may be placed over a touch screen 22 in a front face of the hand held electronic device 20 and the additional cover 32 may be placed over a rear face of the hand held electronic device 20. Alternatively, the additional cover 32 may be placed over the touch screen in the front face of the hand held electronic device 20 and the cover 2 may be placed over a rear face of the hand held electronic device 20.

When the additional cover 32 is placed over the touch screen in the front face of the hand held electronic device 20, the deformable region 36 overlies user depressible mechanical keys of the electronic device 20 and is used for non-text input. In addition, the additional cover 32 is configured to enable actuation of the touch screen 22 when a user touches the overlying additional cover 30.

Although the output portion 3 is configured to enable content presented on the touch screen 22 of the electronic device 20 to be visible to a user through the cover 2 when the cover 2 overlies the touch screen 22, this does not preclude actuation of the touch screen 22 when a user touches the overlying output portion 3.

Although the plurality of distinct input portions 4 enable a user of the electronic device to accurately locate a position of an input portion 4 using touch, this does not necessarily preclude a configuration that enables content presented on the touch screen 22 of the electronic device 20 to be visible to a user through the distinct input portions 4.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus configured to overlie a touch screen of an electronic device, the apparatus comprising:
    side walls;
    end walls; and
    a front face, bounded by the side walls and end walls, comprising:
        an output portion configured to enable content presented on the touch screen to be visible to a user through the output portion; and
        a plurality of distinct input portions each sharing a physical characteristic that demarcates each of the plurality of distinct input portions as an input portion,
        wherein each of the plurality of distinct input portions is configured to enable one of a plurality of touch sensitive areas of the touch screen to be actuated, and
        wherein the plurality of distinct input portions are configured such that the electrical properties of the distinct input portions are changed when the distinct input portion is deformed to enable the touch screen to distinguish between a user touching an input portion and the user pressing an input portion;
    wherein the front face, side walls and end walls form a cavity configured to receive at least part of the electronic device; and
    wherein the apparatus is configured to be user releasably attached to the electronic device.

2. An apparatus as claimed in claim 1, wherein each of the plurality of distinct input portions has a common relief that is different to adjacent portions of the apparatus.

3. An apparatus as claimed in claim 1, wherein each of the plurality of distinct input portions has a relative permittivity greater than that of the output portion.

4. An apparatus as claimed in claim 1, wherein the plurality of distinct input portions comprise silicone or capacitive silicone.

5. An apparatus as claimed in claim 1, wherein the plurality of distinct input portions are transparent.

6. An apparatus as claimed in claim 1, wherein the output portion comprises polycarbonate.

7. An apparatus as claimed in claim 1, comprising apertures for ports of the electronic device.

8. An apparatus as claimed in claim 1, comprising a mechanism configured to secure the apparatus to the electronic device.

9. An apparatus as claimed in claim 1, further configured to be attachable to a rear face of the electronic device.

10. An apparatus as claimed in claim 1 wherein the apparatus is comprised in a supplementary cover configured to overlie the touch screen of the electronic device.

11. An apparatus as claimed in claim 1 wherein the apparatus is comprised in a supplementary cover configured to overlie the touch screen of the electronic device and at least part of an external cover of the electronic device.

12. An apparatus as claimed in claim 1 wherein the cavity is configured to receive at least part of the external housing of the hand held electronic device.

13. An apparatus as claimed in claim 1 wherein the apparatus may be placed over the rear face of the electronic device and stowed there.

14. An apparatus as claimed in claim 1, wherein the plurality of distinct input portions are supported by a one-piece rigid housing that forms the output portion.

15. An apparatus as claimed in claim 1, wherein enabling the touch screen to distinguish between a user touching an input portion and the user pressing an input portion comprises using a decrease in thickness of the distinct input portion to cause the change in the electrical property of the input portion.

16. An apparatus as claimed in claim 1, wherein enabling the touch screen to distinguish between a user touching an input portion and the user pressing an input portion comprises the material of the distinct input portion having its electrical property change substantially when compressed.

17. A system comprising:
    an electronic device comprising a housing having a rear face and a front face comprising a touch screen; and
    an apparatus configured to overlie the touch screen of the electronic device, the apparatus comprising:
        side walls;
        end walls; and
        a front face, bounded by the side walls and end walls, comprising:
            an output portion configured to enable content presented on the touch screen to be visible to a user through the output portion; and
            a plurality of distinct input portions each sharing a physical characteristic that demarcates each of the plurality of distinct input portions as an input portion,
            wherein each of the plurality of distinct input portions is configured to enable one of a plurality of touch sensitive areas of the touch screen to be actuated, and
            wherein the plurality of distinct input portions are configured such that the electrical properties of the distinct input portions are changed when the distinct input portion is deformed to enable the touch screen to distinguish between a user touching an input portion and the user pressing an input portion;
        wherein the front face, side walls and end walls form a cavity configured to receive at least part of the housing of the electronic device; and wherein the apparatus is configured to be user releasably attached to the electronic device.

18. A system as claimed in claim 17 comprising:
an additional apparatus configured to overlie the touch screen of the electronic device, the additional apparatus comprising:
side walls;
end walls; and
a front face, bounded by the side walls and end walls, configured to enable content presented on the touch screen to be visible through the apparatus and configured to enable touch actuation of the touch screen;
wherein the system is configurable in a first configuration and a second configuration, wherein in the first configuration the apparatus overlies the touch screen of the electronic device and the additional apparatus overlies the rear face of the electronic device, and in the second configuration the additional apparatus overlies the touch screen of the electronic device and the apparatus overlies the rear face of the electronic device.

19. A method comprising:
providing an apparatus configured to overlie a touch screen of an electronic device; and
receiving at least part of the electronic device within a cavity of the apparatus, the apparatus comprising:
sidewalls;
end walls; and
a front face, bounded by the side walls and end walls, comprising:
an output portion configured to enable content presented on the touch screen to be visible to a user through the output portion; and
a plurality of distinct input portions each sharing a physical characteristic that demarcates each of the plurality of distinct input portions as an input portion, wherein each of the plurality of distinct input portions is configured to enable one of the plurality of touch sensitive areas of the touch screen to be actuated, and
wherein the plurality of distinct input portions are configured such that the electrical properties of the distinct input portions are changed when the distinct input portion is deformed to enable the touch screen to distinguish between a user touching an input portion and the user pressing an input portion;
wherein the front face, side walls and end walls form the cavity; and
wherein the apparatus is configured to be user releasably attached to the electronic device.

20. A method as claimed in claim 19 wherein the apparatus is comprised in a supplementary cover configured to overlie the touch screen of the electronic device and at least part of an external cover of the electronic device.

* * * * *